United States Patent
Baskin-Lockman et al.

Patent Number: 6,139,100
Date of Patent: *Oct. 31, 2000

[54] CHILD'S CAR SEAT WITH MULTI-POSITIONABLE HEADREST

[75] Inventors: Sharon Baskin-Lockman; Ronald B. Berringer, both of Aurora, Ohio

[73] Assignee: Graco Children's Products Inc., Elverson, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/272,214

[22] Filed: Mar. 19, 1999

[51] Int. Cl.⁷ .............................. A47C 1/08; A47D 1/10; B60N 2/28

[52] U.S. Cl. ................ 297/250.1; 297/219.12; 297/220; 297/230.14; 297/397; 297/410; 411/508; 411/509

[58] Field of Search ............... 297/250.1, 219.12, 297/220, 219.1, 230.14, 397, 410; 5/655; 403/326; 411/508, 509, 913

[56] References Cited

U.S. PATENT DOCUMENTS

| | | | |
|---|---|---|---|
| D. 328,683 | 8/1992 | Kalozdi | D6/601 |
| 2,638,152 | 5/1953 | Pulsifer . | |
| 3,342,095 | 9/1967 | Buntic | 411/508 |
| 3,490,300 | 1/1970 | Toma | 411/508 X |
| 3,608,964 | 9/1971 | Earl | 297/397 |
| 3,688,635 | 9/1972 | Fegen | 411/508 X |
| 3,853,350 | 12/1974 | Leffler | 297/404 |
| 4,097,086 | 6/1978 | Hudson | 297/397 X |
| 4,383,713 | 5/1983 | Roston | 297/219.12 X |
| 4,402,548 | 9/1983 | Mason | 297/464 |
| 4,434,513 | 3/1984 | Welch . | |
| 4,478,453 | 10/1984 | Schutz | 297/219.12 |
| 4,568,125 | 2/1986 | Sckolnik | 297/467 |
| 4,688,849 | 8/1987 | Tsuge et al. | 297/250.1 |
| 4,738,488 | 4/1988 | Camelio | 297/393 |
| 4,779,930 | 10/1988 | Rosen | 297/397 X |
| 4,790,601 | 12/1988 | Burleigh et al. | 297/484 |
| 4,836,611 | 6/1989 | Talaugon | 297/391 |
| 4,854,639 | 8/1989 | Bruleigh et al. | 297/250.1 |
| 4,892,357 | 1/1990 | Nieto-Busby et al. | 297/464 |
| 5,054,853 | 10/1991 | Gillies et al. | 297/250.1 |
| 5,056,533 | 10/1991 | Gillies et al. | 297/250 |
| 5,064,245 | 11/1991 | Stephens | 297/391 X |
| 5,106,158 | 4/1992 | Dukatz et al. | 297/396 |
| 5,108,152 | 4/1992 | Reilly et al. | 297/482 |
| 5,161,522 | 11/1992 | Clevenger | 297/410 X |
| 5,161,855 | 11/1992 | Harmon | 297/391 X |
| 5,220,700 | 6/1993 | Liu | 297/393 X |
| 5,228,745 | 7/1993 | Hazel | 297/219.12 X |
| 5,228,746 | 7/1993 | Burleigh | 297/250.1 |
| 5,248,182 | 9/1993 | Hittie | 297/397 X |
| 5,275,462 | 1/1994 | Pond et al. | 297/391 X |

(List continued on next page.)

OTHER PUBLICATIONS

Smart Move advertisement, 1 page (undated).
Next Step Stage II Cart Seat advertisement, 1 page (1998).

*Primary Examiner*—Peter M. Cuomo
*Assistant Examiner*—Rodney B. White
*Attorney, Agent, or Firm*—Foley & Lardner

[57] ABSTRACT

A child's car seat (20) includes a backrest (26) with a plurality of strap slots (34) formed therein, a seat portion (24), and a removable headrest (22). The headrest (22) has a pair of projections (50) each having a pair of leaves (86) that extend outwardly from the other toward opposed peaks (88) and inwardly from the peaks (88) to form a head (80). The head (80) is rounded and the leaves (86) are flexible, such that upon initial insertion into the strap slots (34) the leaves (86) compress to facilitate ingress of the projection (50), and upon complete insertion, the leaves (86) expand to inhibit removal of the headrest (22). The position of the headrest (22) relative to the seat (20) is thus adjustable, according to the size of the child, dependent on into which of the plurality of slots (34) the projections (50) are inserted. The headrest (22) includes a pillow (54) shaped to have a lower portion (58) which helps to support the child's head and deter its forward motion.

10 Claims, 5 Drawing Sheets

U.S. PATENT DOCUMENTS

| | | | |
|---|---|---|---|
| 5,297,304 | 3/1994 | O'Sullivan | 297/397 X |
| 5,301,396 | 4/1994 | Benoit | 411/509 X |
| 5,310,245 | 5/1994 | Lyszczasz | 297/397 X |
| 5,339,472 | 8/1994 | Yin | 5/631 |
| 5,383,711 | 1/1995 | Houghteling | 297/397 |
| 5,466,044 | 11/1995 | Barley et al. | 297/250.1 X |
| 5,486,037 | 1/1996 | Harper | 297/397 |
| 5,487,588 | 1/1996 | Burleigh et al. | 297/250.1 X |
| 5,524,965 | 6/1996 | Barley | 297/256.16 |
| 5,567,007 | 10/1996 | Czernakowski et al. | 297/250.1 |
| 5,586,351 | 12/1996 | Ive | 5/655 |
| 5,611,596 | 3/1997 | Barley et al. | 297/256.13 |
| 5,662,382 | 9/1997 | Kerr et al. | 297/410 X |
| 5,735,576 | 4/1998 | Pepys et al. | 297/219.12 X |
| 5,775,860 | 7/1998 | Meyer | 411/508 X |
| 5,829,829 | 11/1998 | Clestina-Krevh | 297/219.12 |
| 5,829,830 | 11/1998 | Maloney | 297/219.12 X |
| 5,842,739 | 12/1998 | Noble | 297/219.12 |
| 6,030,047 | 2/2000 | Kain | 297/250.1 |

CHILD'S CAR SEAT WITH MULTI-POSITIONABLE HEADREST

TECHNICAL FIELD

The present invention relates to a child's car seat and headrest. More particularly, the present invention relates to an apparatus for securing a headrest to a child's car seat at multiple positions on the car seat.

BACKGROUND ART

Child's car seats are designed to secure a child within a vehicle. These seats must accommodate children of various size as the child grows. Thus, these seats are not custom-fitted to each child. Since the seat is generally larger than the child, the child's head is unsupported unless it is provided with a headrest to position the child's head or to provide a more comfortable ride for the child.

The headrest supports and, to an extent, immobilizes the child's head to provide comfort and protection. Known headrests provide lateral support to prevent side to side motion of the child's head. The backrest keeps the child's head from moving backward. But these headrests do not deter forward motion of the child's head. This type of motion could cause discomfort or injury depending on the surrounding circumstances.

In order to position the headrests at multiple locations as the child grows, some known headrests are selectively attached to the car seat backrest or side supports by VEL-CRO. However, in many child's car seats, the backrest contains a number of strap holes or slots that can interfere with the use of VELCRO to attach the headrest. The function of these slots is to permit shoulder straps to pass through the back of the seat to secure the child within the seat. However, these slots inhibit the use of VELCRO because the VEL-CRO hooks will not attach to the open space. In addition, some slots are provided with a reinforcing grommet surrounding the slot. The surface properties of the grommet again prevent attachment of the hooks. Thus, known headrests that use VELCRO are disadvantageous when used with car seats containing strap slots and grommets.

In addition, VELCRO attachment is disadvantageous because it does not provide positive feedback that the headrest is secured in place. The headrest may be partially attached with the VELCRO and then slip as the child moves within the seat.

Other known headrests that use the child's body weight or an interference fit between the lateral supports to hold the headrest in place are prone to slip with the child's movements. Furthermore, the child's movements make it difficult to initially place the headrest in the proper position. Movement of the headrest out of, or not initially placing the headrest in, the proper position may cause discomfort to the child and increase the risk of injury.

Therefore, there is a need for a child's car seat and headrest that can be easily secured in multiple positions, and used with strap holes. There is an additional need for a child seat and headrest with an apparatus for attaching the headrest that prevents the headrest from slipping, or otherwise moving out of the proper position. There is also a need for a car seat that provides positive feedback upon attaching the headrest to the seat. Finally, there is a need for a car seat that provides a tight-fitting headrest that deters forward motion of the child's head.

DISCLOSURE OF THE INVENTION

It is therefore an object of the present invention to provide a child's car seat with a headrest that can be positioned at multiple locations on the seat.

It is another object of the invention to provide a child's car seat, as above, with a headrest having projections that are received within a slot in the seat.

It is yet another object of the present invention to provide a child's car seat, as above, that provides positive feed back upon securing the headrest to the seat.

It is a further object of the present invention to provide a child's car seat, as above, wherein the headrest attaches with a simple thrusting motion.

It is an additional object of the present invention to provide a child's car seat, as above, with a headrest that deters forward rotation of the child's head.

It is a still further object of the present invention to provide a child's car seat, as above, with a headrest having two banana-shaped pillows that surround the child's head and extend beneath the child's chin.

It is still another object of the present invention to provide a child's car seat, as above, with a headrest that deters the child's head from moving forward or to the side.

These and other objects of the present invention, as well as the advantages thereof over existing prior art forms, which will become apparent from the description to follow, are accomplished by the improvements hereinafter described and claimed.

In general, a child's car seat includes a backrest having at least one slot formed therethrough, a seat portion, and a headrest. At least one projection extends from the headrest and can be inserted into the slot.

A preferred exemplary child's car seat with headrest incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
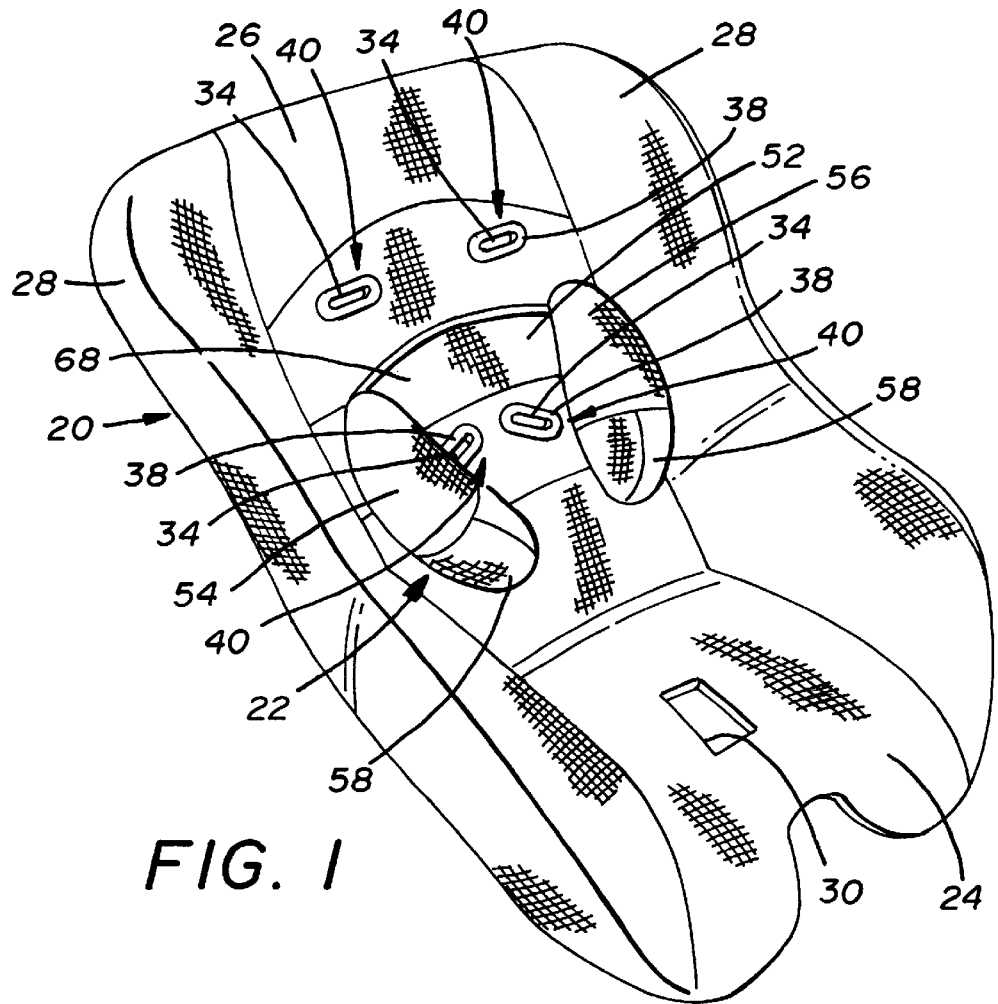
FIG. 1 is a perspective view of a child's car seat (support frame not shown) made in accordance with the concepts of the present invention with the headrest attached thereto.
Figure 9:
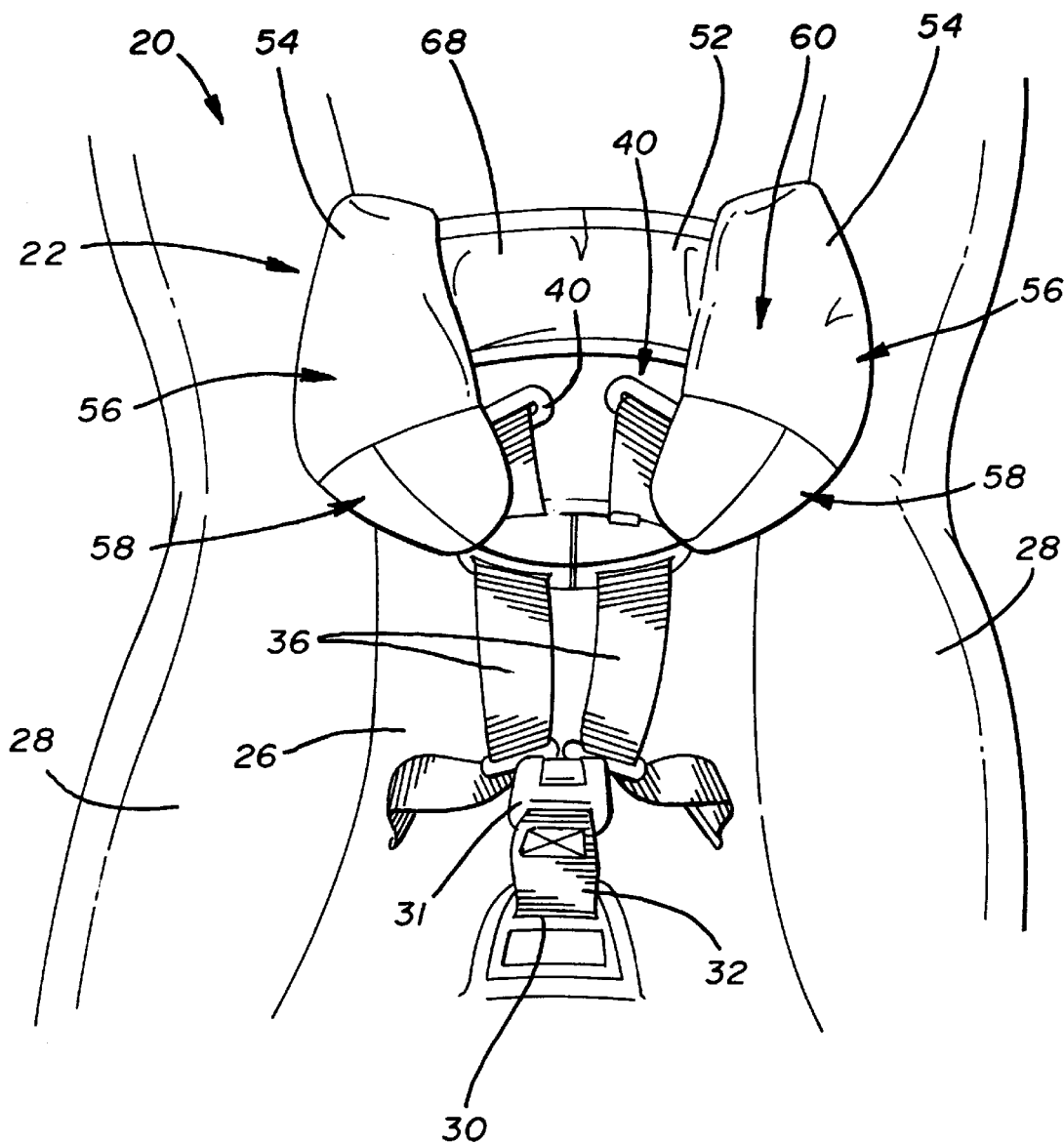
FIG. 9 is a fragmented schematic elevational view showing the child's car seat in an installed position.

A child's car seat made according to the present invention is generally indicated by the numeral 20 and is shown in FIGS. 1 and 9 with a headrest, generally indicated by the numeral 22, mounted thereon. Child's car seat 20 includes a frame (not shown), which carries a seat portion 24, a backrest 26, and opposed side supports 28. The surfaces of seat portion 24, backrest 26, and sides supports 28 are cushioned with a padded fabric cover. Seat portion 24 includes a generally centrally located hole 30 for receiving a locking portion 31, FIG. 9, of a seat belt 32 therethrough. Backrest 26 includes a plurality of strap slots 34 for receiving shoulder straps 36. Openings corresponding to center hole 30 and strap slots 34 are formed within the fabric cover.

Figure 2:
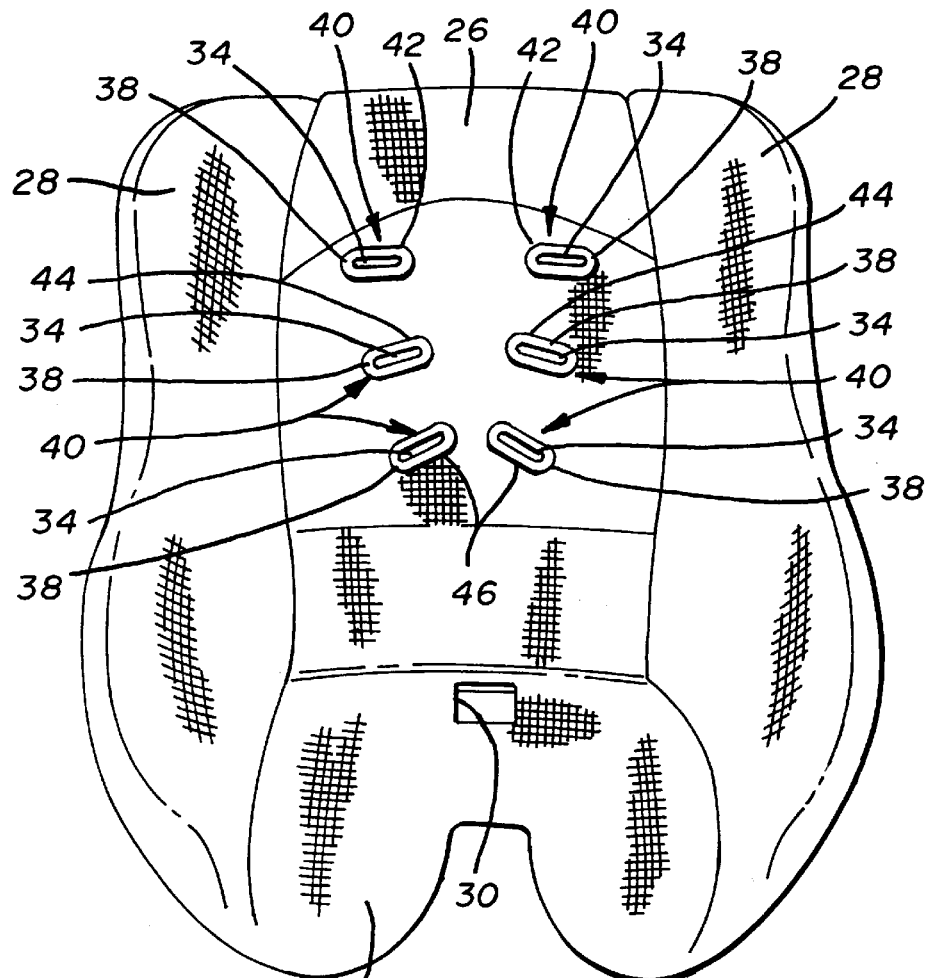
FIG. 2 is a front elevational view of a seat pad with the headrest detached therefrom.

As best shown in FIG. 2, a grommet 38 surrounds strap slots 34. Since shoulder straps 36 exert a great deal of force on the material surrounding slots 34, grommets 38 are provided to reinforce this area. Grommets 38 can be made of any suitable reinforcing material, such as a suitable plastic material. Grommets 38 can be attached to seat portion 24 in any conventional manner including sewing, adhesives, or, in the preferred embodiment, two sections of the grommet can be squeezed and locked together sandwiching the cover fabric between them. The combined strap slot 34 and grommet 38 are commonly referred to in the art as a glamour cap, generally indicated by the numeral 40.

A number of glamour caps 40 are spaced along the length of backrest 26 to receive shoulder straps 36. The shoulder straps 36 pass through the glamour caps 40, over the child's shoulders, and then are inserted into the locking portion 31. These caps 40 are located generally medially along backrest 26, and are associated in pairs to accommodate dual shoulder straps 36. As shown in FIG. 2, highest pair 42 is more widely spaced than the next lowest pair, in this case the middle pair 44, which is more widely spaced than the lowest pair 46. Thus, from top to bottom, each pair is progressively spaced closer to each other to adjust for the relative size of a child at each height. For smaller children, straps 36 are preferably received through lowest pair 46 and for larger children, they would be received through middle pair 44 as shown in FIG. 9.

Figure 3:
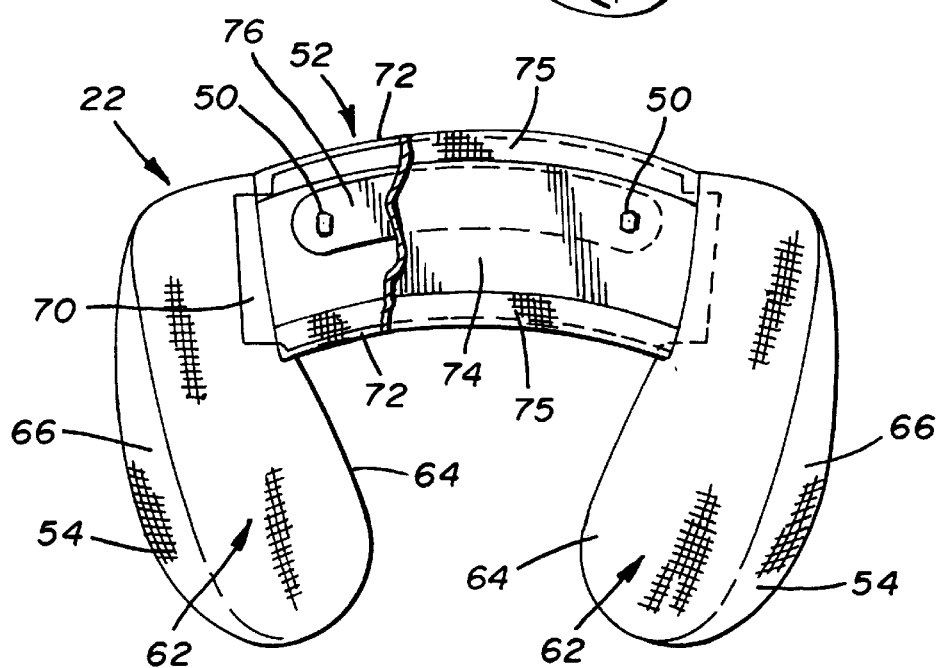
FIG. 3 is a partially broken away rear elevational view of a headrest for a child's car seat made in accordance with the concepts of the present invention.
Figure 8:
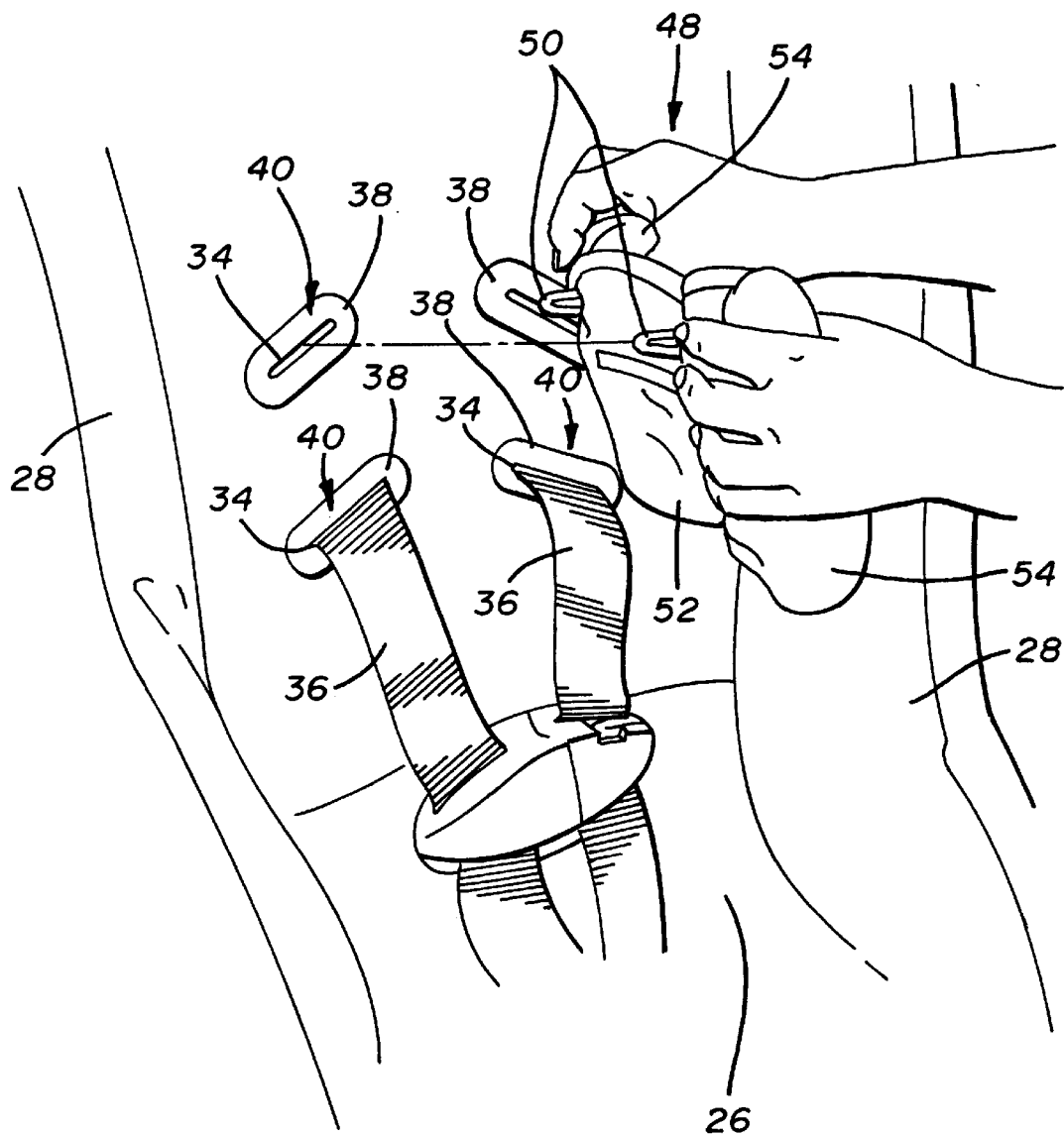
FIG. 8 is a schematic fragmented perspective view showing the manner in which the headrest is attached to the child'car seat.

As shown in FIG. 3, headrest 22 includes a neck pad 52 positioned between laterally spaced pillows 54 which are adapted to support and cushion the child's head. As shown in FIG. 8, and as will hereinafter be described in detail, headrest 22 is mounted on the seat back 26 by means of projections, generally indicated by the numeral 50, that may be positioned through one of the cap pairs 42, 44, or 46. Attachment of the headrest is described more fully below. Pillows 54 are roughly crescent-shaped or banana-shaped having opposed upper portions 56 and opposed lower portions 58. When the child's head rests between pillows 54, lower portion 58 at least partially extends beneath the child's head. Lower portion 58 is also preferably angled inwardly from upper portion 56. In this manner, pillows 54 cup and cradle the child's head, and lower portion 58 supportingly engages the child's chin and impedes forward rotation of the child's head.

To further cradle and support the child's head, pillows 54 have a concave front surface 60, so as to cradle and center the child's head between pillows 54, and impede its sideward motion. From the back, FIG. 3, pillows 54 taper inwardly towards the top. Back surface 62 of each pillow 54 is slightly tapered outward from inner side 64 of pillow 54 to its outer side 66. The inner side 64 of each pillow 54 attaches to neck pad 52 at the top of each pillow 54. Any conventional attachment technique can be used to attach pillow 54 to neck pad 52 including but not limited to using stitching, adhesives, hooks and eyes, snaps, buttons, ties, or any other fastener. As shown, pillows 54 are preferably sewn to neck pad 52.

Neck pad 52 is generally a flat padded member and includes a first layer of fabric 68, FIG. 1, and a backing member 70 which capture a layer of padding (not shown). The first layer of fabric extends beyond this padding and wraps around top and bottom edges 72 of backing member 70. The fabric that wraps around backing member 70 overlaps a second layer of fabric 74 that covers the side of backing member 70 that rests against seat back 26. This material is provided with holes permitting the protrusion of headrest prongs 50. The edges of second layer 74 are trapped between backing member 70 and overlapping portion 75 of the first fabric layer 68. As above, the two layers of fabric may be joined or secured to backing member 70 in a conventional manner, preferably stitching.

Projections or prongs 50 extend through openings formed within second layer 74 of the fabric. These prongs 50 may be attached directly to backing member 70 by conventional techniques or integrally formed with backing member 70. In the preferred embodiment, prongs 50 extend from backing member 70. Backing member 70 is shown as a single band of material spanning across neck pad 52. But, as can be appreciated, backing member 70 can be segmented to provide more flexibility to neck pad 52. Similarly, each prong 50 can extend from a separate segment of backing material. In other words, each prong 50 can extend from a separate backing member 70, or otherwise be fastened thereto, as described above. For simplicity, backing member 70 will be referred to in the singular sense, but is intended to encompass multiple or segmented pieces of backing material. This material can be any suitable flexible material such as plastic.

FIG. 3 shows a pair of projections or prongs 50 extending from backing member 70. Prongs 50, like backing member 70, are made of an elastic material, preferably plastic. In the preferred embodiment, a pair of projections or prongs 50 is used to prevent rotation of headrest 22. More than two prongs 50 can be used to further stabilize headrest 22. In an alternative embodiment, neck pad 52 can be omitted, and a single prong 50 can extend from each pillow. Since prongs 50 are preferably identical, the following description will refer to a single projection or prong 50.

Figure 4:
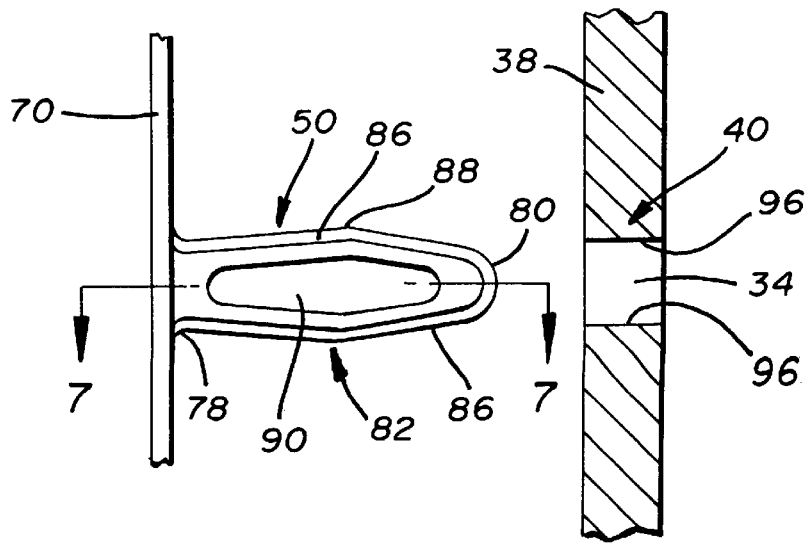
FIG. 4 is a partially sectioned side elevational view of a projection prior to insertion into the child's car seat.

In FIG. 4, a projection 50 is shown extending from backing member 70. Backing member 70 may be reinforced, as shown in FIG. 3, with a reinforcing base 76. Base 76 can be mounted on the inside of backing member 70, or on the rear side of backing member 70. In the latter case prong 50 extends from or is affixed to base 76. Each prong 50 includes a neck 78 positioned adjacent to base 76 and a head 80 is formed at the outer ends thereof. Head 80 can be shaped in a conventional manner to ease its entry into slot 34 of glamour cap 40. For example, the head can be tapered, rounded, or brought to a point. It may have angular faces or present a smooth continuous surface. As shown, the preferred head 80 has a rounded front face.

A throat 82 joins head 80 and neck 78. Throat 82 is designed to compress upon insertion into a slot 38. Preferably throat 82 is cambered, and presents a continuous surface between head 80 and neck 78.

The preferred throat 82 is formed by two opposed leaves 86. These leaves 86 extend from neck 78 and outwardly from each other to form generally central peaks 88. From peaks 88, leaves 86 extend inwardly and converge at head 80. A cavity 90 is formed between leaves 86 increasing the flexibility of the projection 50 with respect to compressive forces applied to projection 50 during insertion.

Figure 5:
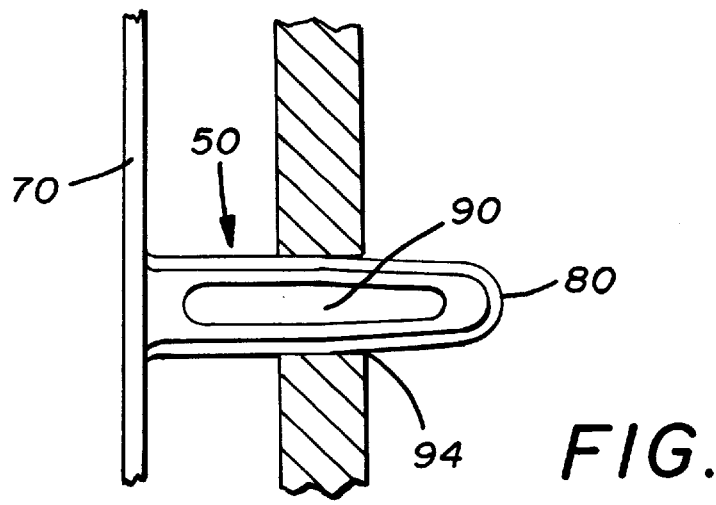
FIG. 5 is a partially sectioned side elevational view of the projection during insertion into the child's car seat and sequentially following FIG. 4.
Figure 6:
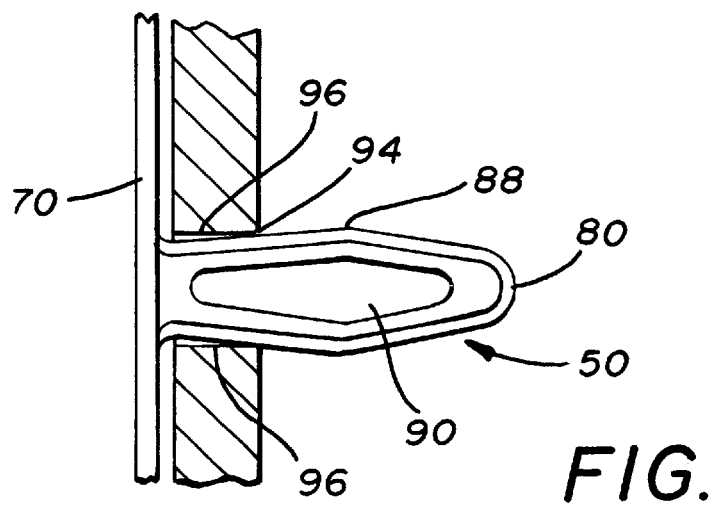
FIG. 6 is a partially sectioned side elevational view of the projection after insertion into the child's car seat and sequentially following FIG. 5.
Figure 7:
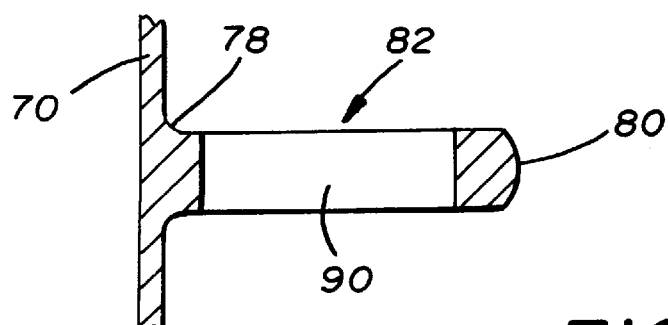
FIG. 7 is a sectional view taken substantially along line 7—7 of FIG. 4.

The manner in which projections 50 are inserted is shown in FIG. 8. Headrest 22 is held such that projections 50 are aligned with glamour caps 40. With a thrusting motion, projections 50 are inserted into corresponding glamour caps 40. FIGS. 4-6 show the sequence of operation as a projection 22 is being inserted into a glamour cap 40. Before insertion (FIG. 4), throat 82 is in a non-compressed or uncompressed configuration. Upon insertion, head 80 enters slot 34 of glamour cap 40. As best shown in FIG. 5, leaves 86 compress to conform to the size of slot 34. With leaves 86 compressed, projection 50 assumes a compressed configuration (FIG. 5), until peaks 88 pass beyond distal end 94 of glamour cap 40. Then peaks 88 expand and projection 50, as best shown in FIG. 6, returns to the expanded position, as in FIG. 4. The expansion causes a vibration that can be felt by the user, and heard as a popping or clicking sound.

After expansion, the expanded leaves 86 create an interference fit between themselves and opposed walls 96 of slot 34 preventing the projection 50 from errantly disengaging glamour cap 40. The projection height is made very close to the slot height to provide a tight fit between projection 50 and glamour cap 40. The tight fit between projection 50 and glamour cap 40 combined with the extension of projection 50 beyond glamour cap 40 helps headrest 22 resist the torsional forces created by the child's movement. In this manner, projections 50 keep headrest 22 from slipping or wobbling.

For smaller children, with shoulder straps 36 passing through the lowest pair 46 of glamour caps 40, projections 50 may be inserted through the middle pair 44 of glamour caps 40. For larger children, however, with shoulder straps 36 passing through the middle pair 44 of glamour caps 40, projections 50 may be inserted through the highest pair 42 of glamour caps 40. While thus two positions for headrest 22 are shown, it should be evident that by increasing the number of pairs of glamour caps 40, any number of multiple positions could be provided.

From the foregoing, it should be evident that a child's car seat with headrest constructed as described herein accomplishes the objections of the invention and otherwise substantially improves the art.

What is claimed is:

1. A child's car seat adapted to be attached to a vehicle seat comprising:

a backrest having vertically spaced slots formed therethrough, a seat portion, and a head rest detachably connectable to said backrest by at least one projection extending from said headrest, wherein said projection is insertably received within one of said slots, said projection including a flexible throat which contracts upon insertion into said one slot and expands after insertion into said one slot to maintain said projection in said one slot.

2. A child's car seat according to claim 1 wherein said backrest is provided with at least one pair of slots, and a corresponding pair of projections extend from said headrest.

3. A child's car seat according to claim 2 wherein said backrest is provided with a plurality of vertically spaced pairs of slots, said pair of projections being received in a selected pair of said plurality of vertically spaced pairs.

4. A child's car seat according to claim 3 wherein said projection includes a head at an outer end of said throat, said head being inserted into said slot.

5. A child's car seat according to claim 1 wherein said headrest includes two spaced pillows.

6. A child's car seat according to claim 5 further comprising a neck pad between said pillows.

7. A child's car seat according to claim 6 wherein said pillows have a flat back surface and a concave front surface.

8. A child's car seat according to claim 8 wherein said pillows are crescent-shaped.

9. A child's car seat according to claim 1 further comprising a backing member affixed to said headrest.

10. A child's car seat according to claim 9 wherein said projection extends from said backing member.

* * * * *